US011925965B1

(12) United States Patent
Ho

(10) Patent No.: US 11,925,965 B1
(45) Date of Patent: Mar. 12, 2024

(54) PNEUMATIC RUST-REMOVING TOOL

(71) Applicant: Chuan-Cheng Ho, Taichung (TW)

(72) Inventor: Chuan-Cheng Ho, Taichung (TW)

( * ) Notice: Subject to any disclaimer, the term of this patent is extended or adjusted under 35 U.S.C. 154(b) by 0 days.

(21) Appl. No.: 18/242,807

(22) Filed: Sep. 6, 2023

(51) Int. Cl.
*B08B 7/02* (2006.01)

(52) U.S. Cl.
CPC .................................... *B08B 7/022* (2013.01)

(58) Field of Classification Search
CPC ... B25D 2250/181; B08B 1/005; B08B 15/04; B08B 1/00; B08B 7/02; Y10T 29/45; Y10T 29/4567; Y10T 29/4594; Y10T 29/4578; Y10T 29/4572; B21C 43/00; B23P 9/04; B23D 79/06; B23D 79/02; B23D 79/00; B24B 27/033; B24B 29/005; B24B 39/006; C21D 7/04
See application file for complete search history.

(56) References Cited

U.S. PATENT DOCUMENTS 3,937,055 A * 2/1976 Caruso ...................... B23P 9/04 173/132
5,010,632 A * 4/1991 Gardner .................. B08B 7/022 29/81.14
2021/0394352 A1* 12/2021 Hsieh ...................... B21C 43/00
2022/0161386 A1* 5/2022 Liu ......................... B24B 47/14

* cited by examiner

*Primary Examiner* — Jason L Vaughan
*Assistant Examiner* — Amanda Kreiling
(74) *Attorney, Agent, or Firm* — Birch, Stewart, Kolasch & Birch, LLP

(57) ABSTRACT

A pneumatic rust-removing tool includes a main body having a chamber and an opening at a front end of the chamber, an impact block reciprocatingly moveable back and forth in the chamber, a spring disposed in the chamber, a mount disposed in the chamber and located between the impact block and the spring, rust-removing needles disposed with the mount and extending through the opening, and a slide sleeve disposed to the main body in a way that the slide sleeve is moveable back and forth relative to the main body. The slide sleeve is provided with a plurality of through holes, through which the rust-removing needles extend respectively. As a result, the pneumatic rust-removing tool can quickly adjust the exposed lengths of the rust-removing needles to adapt to different operational scenarios, thereby enhancing work efficiency and reducing the economic burden on the user.

10 Claims, 3 Drawing Sheets

PNEUMATIC RUST-REMOVING TOOL

BACKGROUND OF THE INVENTION

1. Field of the Invention

The present invention relates generally to a pneumatic tool and more particularly, to a pneumatic rust-removing tool.

2. Description of the Related Art

Conventional pneumatic rust-removing tools utilize high-pressure gas to drive an internal impact block. This impact block then strikes a plurality of rust-removing needles to move forward. Further, a return spring is employed to pull the rust-removing needles to move backward. As such, continuous reciprocating movements of the rust-removing needles, i.e., rapid vibrations of the rust-removing needles back and forth, are provided to facilitate removal of rust from rusted object. During actual operation, the tips or sides of the rust-removing needles come into contact with the object for rust removal. Typically, the length of the exposed rust-removing needle is about 5 to 6 centimeters. Because the rust-removing needle, which is made of metal material, has a certain elasticity, in some operational scenarios the rust-removing needle might bend due to lateral forces. This bending can result in the force applied by the user not being entirely transferred to the object, resulting in a poor rust-removing efficiency. Alternatively, the user might need to apply greater force to achieve the desired rust-removing effect due to the bending of the needle.

In order to improve the above-mentioned situation, the user would need to disassemble the rust-removing tool and replace the longer rust-removing needles with the shorter ones. However, this replacing task will be inconvenient for the user due to the high quantity of rust-removing needles and the complex operational process involved. Furthermore, when the rust-removing operation transitions to different scenarios, there might be a need to replace the shorter needles with the longer ones. Such frequent replacement tasks significantly hinder work efficiency. If the user prepares two rust-removing tools with different needle lengths simultaneously, this would increase the purchasing cost and cause inconvenience in terms of portability.

SUMMARY OF THE INVENTION

The present invention has been accomplished in view of the above-noted circumstances. It is an objective of the present invention to provide a pneumatic rust-removing tool, which can quickly adjust the exposed lengths of the rust-removing needles to adapt to different operational scenarios, thereby enhancing work efficiency and alleviating economic burden on the user.

To attain the above objective, the present invention provides a pneumatic rust-removing tool comprising a main body, an impact block, a spring, a mount, rust-removing needles, and a slide sleeve. The main body includes a chamber at an inside thereof, and an opening at a front end of the chamber. The impact block is reciprocatingly moveable back and forth in the chamber. The spring is disposed in the chamber. The mount is disposed in the chamber and located between the impact block and the spring. The rust-removing needles are disposed with the mount and extend through the opening. The slide sleeve is disposed to the main body in a way that the slide sleeve is moveable back and forth relative to the main body. The slide sleeve is provided with a plurality of through holes, through which the rust-removing needles extend respectively. As a result, by means of moving the slide sleeve relative to the main body, the pneumatic rust-removing tool can quickly adjust the exposed lengths of the rust-removing needles to adapt to different operational scenarios, thereby enhancing work efficiency and alleviating the economic burden on the user.

BRIEF DESCRIPTION OF THE DRAWINGS

The present invention will become more fully understood from the detailed description given herein below and the accompanying drawings which are given by way of illustration only, and thus are not limitative of the present invention, and wherein.

DETAILED DESCRIPTION OF THE INVENTION

Figure 1:
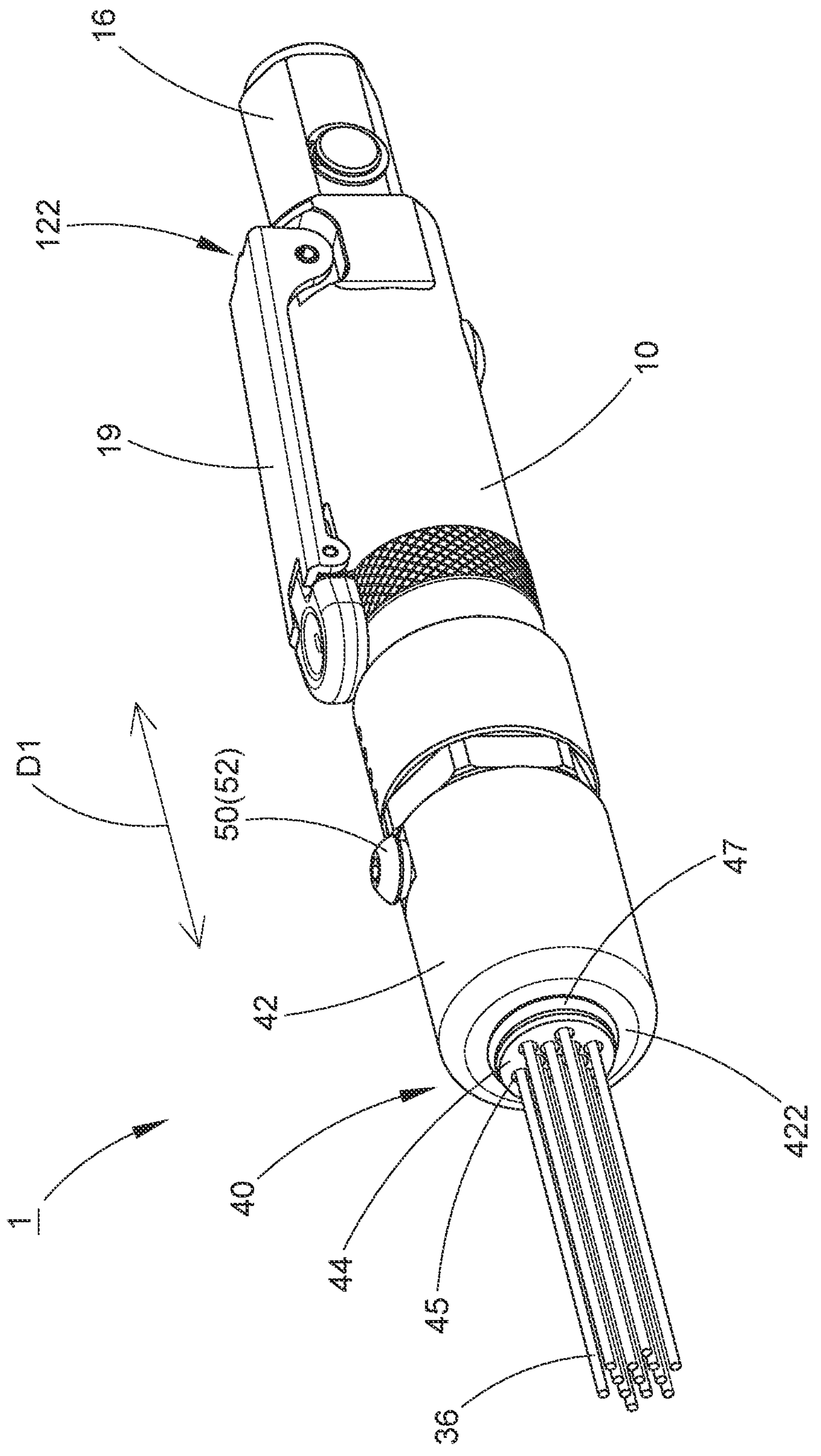
FIG. 1 is a perspective view of a pneumatic rust-removing tool according to an embodiment of the present invention.
Figure 2:
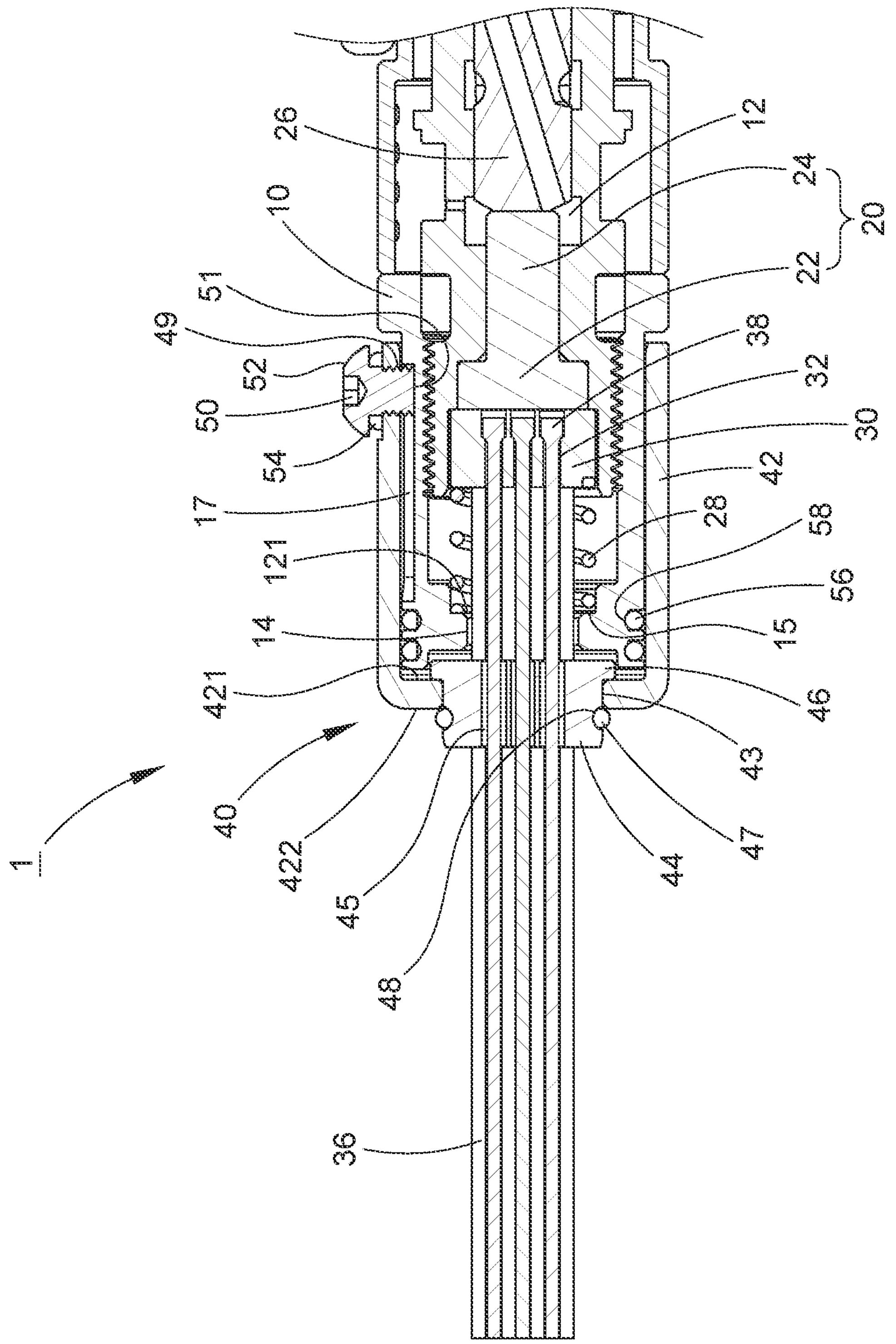
FIG. 2 is a partially cross-sectional view of the pneumatic rust-removing tool of the embodiment of the present invention.

The structure and technical features of the present invention will be detailedly described hereunder by a preferred embodiment and accompany drawings. As shown in FIGS. 1-2, a pneumatic rust-removing tool 1 provided by a preferred embodiment of the present invention comprises a main body 10, a trigger 19, an impact block 20, a spring 28, a mount 30, multiple rust-removing needles 36, and a slide sleeve 40.

The main body 10 includes a chamber 12 at an inside thereof, an opening 14 located at a front end 121 of the chamber 12, an air inlet adapter 16 disposed at a rear end 122 of the chamber 12, and a guide groove 17 provided at an outer periphery of the main body 10. The main body 10 is tubular shape and extends in a front-to-back direction D1. In the present application, the front direction refers to the direction toward the left side of FIG. 2, and the back direction refers to the direction toward the right side of FIG. 2. For convenience in manufacturing, the main body 10 is composed of multiple components assembled. The inner side of the opening 14 is provided with annular stop portion 15. The air inlet adapter 16 is configured to be connected to an air source (not shown) to introduce high-pressure gas into the chamber 12. The guide groove 17 is located on the top side of the main body 10 near the opening 14 and extends in a straight line in the front-to-back direction D1. The trigger 19 is pivotally mounted at its rear end on the main body 10 to control the enablement and disablement of the high-pressure gas flowing into the chamber 12.

The impact block 20 is disposed in the chamber 12 in a way that the impact block 20 is reciprocatingly moveable back and forth in the chamber 12. The impact block 20 has a head 22 and a body 24 extending rearward from the central part of the head 22. The body 24 can be driven forward by a piston 26. The piston 26 is driven by the high-pressure gas to strike the impact block 20 continuously.

The spring 28 is located in the chamber 12 adjacent to the opening 14. The mount 30 is disposed in the chamber 12 and located between the head of the impact block 20 and the spring 28. Two ends of the spring 28 are respectively abutted against the stop portion 15 of the main body 10 and the mount 30, forcing the mount 30 to return backward.

The rust-removing needles 36 are mounted to the mount 30 and extend through the opening 14 of the main body 10. Specifically, the mount 30 has mounting holes 32, into which the heads 38 of the rust-removing needles 36 are inserted respectively. The slide sleeve 40 is sleeved onto a front section of the main body 10 in a way that the slide sleeve 40 is moveable back and forth along the main body 10. The slide sleeve 40 has a plurality of through holes 45, through which the rust-removing needles 36 pass respectively. The slide sleeve 40 includes a barrel 42, an axial hole 43 located at one end of the barrel 42, and a positioning block 44 disposed in the axial hole 43. The through holes 45 are provided at the positioning block 44. The positioning block 44 comprises a flange 46 located at an inner inside 421 of the barrel 42, and a retaining ring 47 located at an outer side 422 of the barrel 42, such that the positioning block 44 is coupled to the barrel 42. To firmly position the retaining ring 47, the outer periphery of the positioning block 44 is provided with an annular notch 48, in which the retaining ring 47 is disposed. Since the diameter of each through hole 45 is slightly larger than that of any of the rust-removing needles 36, the rust-removing needles 36 are allowed to freely move back and forth and move laterally within a small range in these through holes 45.

To secure the slide sleeve 40, the slide sleeve 40 comprises a threaded hole 49 radially penetrating a top side of the barrel 42, and a bolt 50 screwingly threaded into the threaded hole 49. When the bolt 50 is tightened, the terminal end 51 of the bolt 50 is abutted against the main body 10, thereby fixing the slide sleeve 40 to the main body 10. To prevent the bolt 50 from loosening due to vibrations during the operation of the pneumatic rust-removing tool 1, a resilient ring 54 is sleeved onto the bolt 50 and abutted against the outer periphery of the barrel 42. The resilient ring 54 is compressed by the head 52 of the bolt 50. For the resilient ring 54, a spring washer, O-ring, or other equivalent component can be used. When the bolt 50 is loosened, the terminal end 51 of the bolt 50 remains within the guide groove 17 of the main body 10, allowing that the sidle sleeve 40 is slidably moveable back and forth along the guide groove 17.

To assist in securing the slide sleeve 40, two O-rings 56 are sleeved onto the outer periphery of the main body 10 and abutted against an inner periphery of the slide sleeve 40 to provide suitable friction, thereby preliminarily fixing the slide sleeve 40 to the main body 10 before the bolt 50 is tightened. Additionally, to firmly position these O-rings 56, two annular notches 58 are provided on the outer periphery of the main body 10 for being disposed with the O-rings 56 respectively. However, in another embodiment, either the bolt 50 or the O-rings 56 may be omitted. Alternatively, the bolt 50 and the O-rings 56 may be omitted, and in this case any proper methods for fixing the slide sleeve 40 to the main body 10 may be used. It is to be understood that one O-ring 56 and one annular notch 58 may be sufficient to fix the slide sleeve 40 to the main body 10 properly and preliminarily.

Figure 3:
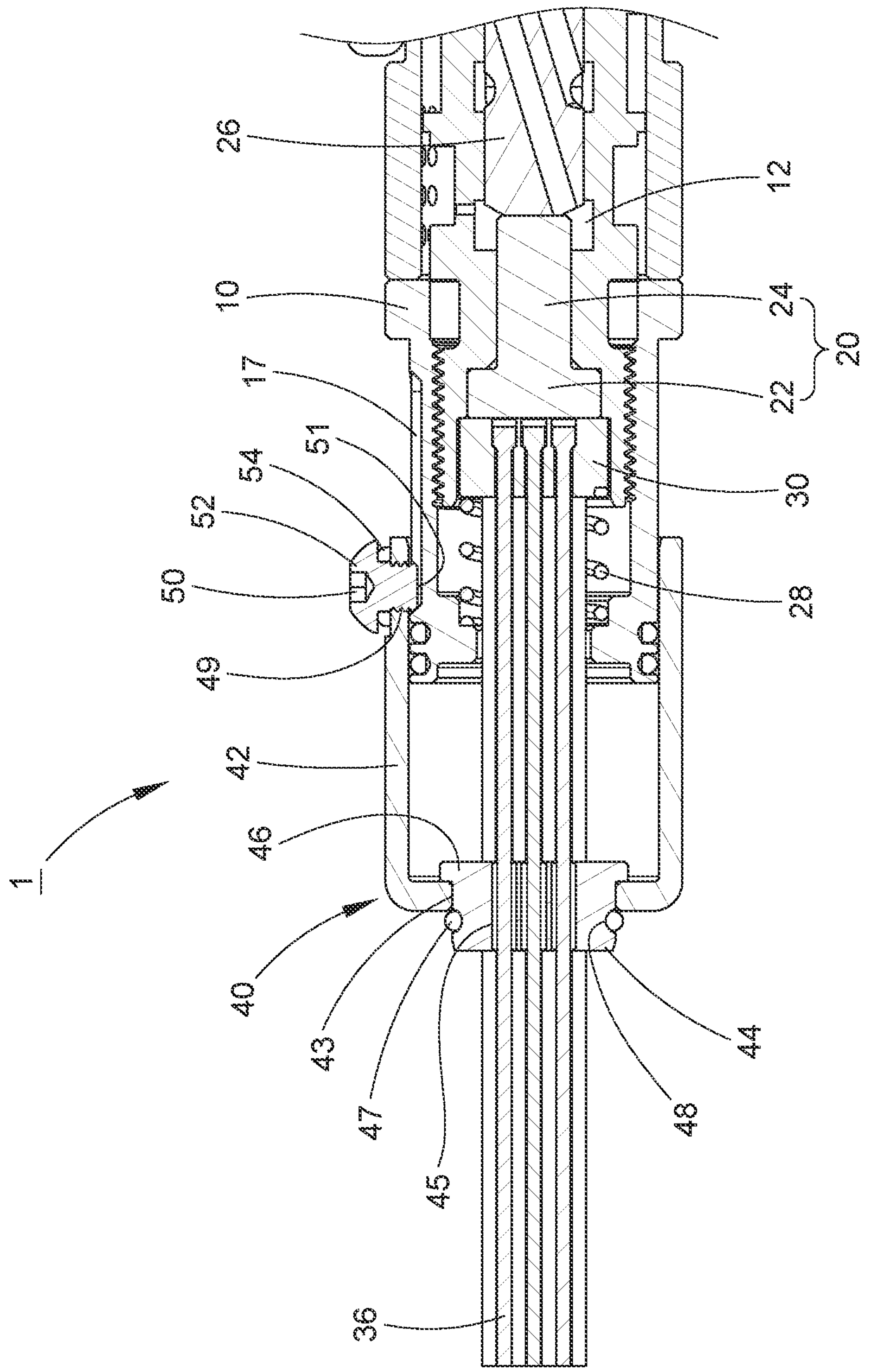
FIG. 3 is another partially cross-sectional view of the pneumatic rust-removing tool of the embodiment of the present invention, showing that a slide sleeve is moved forward to shorten the exposed lengths of the rust-removing needles.

To shorten the exposed lengths of the rust-removing needles 36, the user may loosen the bolt 50 so that the terminal end 51 of the bolt 50 is no longer in contact with the main body 10. Thereafter, the user moves the slide sleeve 40 along the front-to-back direction D1, for example, to the position shown in FIG. 3. Once the slide sleeve 40 is moved to a desired position, the user may then tighten the bolt 50 to fix the slide sleeve 40 again, such that the exposed lengths of the rust-removing needles 36 will be shortened. At this point, the positioning block 44 can serve as a support point, reducing the lateral deformations of the rust-removing needles 36 when the rust-removing needles 36 receive lateral forces. In this way, the force applied by the user can then be effectively transmitted to the item to be derusted, thereby improving the rust-removing efficiency. As can be seen, the adjustment process is simple and quick, and the user can even continuously adjust the position of the slide sleeve 40 as needed for different operational scenarios, changing the exposed lengths of the rust-removing needles 36 incrementally. This provides great convenience in use, eliminates the need to purchase rust-removing tools of different specifications, and thus achieves the objectives of the present invention.

Based on the technical features of the present invention, various modifications to the pneumatic rust-removing tool 1 may be made. For example, the barrel 42 of the slide sleeve 40 and the positioning block 44 may be integrally formed, and the guide groove 17 may be omitted. Such variations are not to be regarded as a departure from the spirit and scope of the invention, and all such modifications as would be obvious to one skilled in the art are intended to be included within the scope of the following claims.

What is claimed is:

1. A pneumatic rust-removing tool, comprising:

a main body including a chamber at an inside thereof, and an opening at a front end of the chamber;

an impact block reciprocatingly moveable back and forth in the chamber;

a spring disposed in the chamber;

a mount disposed in the chamber and located between the impact block and the spring;

a plurality of rust-removing needles disposed with the mount and extending Q through the opening; and a slide sleeve disposed to the main body in a way that the slide sleeve is moveable back and forth relative to the main body, and provided with a plurality of through holes, through which the rust-removing needles extend respectively.

2. The pneumatic rust-removing tool as claimed in claim 1, wherein the slide sleeve comprises a barrel, an axial hole at an end of the barrel, and a positioning block disposed in the axial hole; the positioning block is provided with the through holes.

3. The pneumatic rust-removing tool as claimed in claim 2, wherein the positioning block comprises a flange located inside the barrel, and a retaining ring located outside the barrel, such that the positioning block and the barrel are coupled with each other.

4. The pneumatic rust-removing tool as claimed in claim 3, wherein the positioning block is provided at an outer periphery thereof with an annular notch, in which the retaining ring is disposed.

5. The pneumatic rust-removing tool as claimed in claim 1, wherein at least one O-ring is sleeved onto an outer periphery of the main body and abutted against an inner periphery of the slide sleeve.

6. The pneumatic rust-removing tool as claimed in claim 5, wherein the main body is provided at the outer periphery thereof with at least one annular notch, in which the at least one O-ring is disposed.

7. The pneumatic rust-removing tool as claimed in claim 1, wherein the slide sleeve comprises a barrel, a threaded hole provided at the barrel, and a bolt screwingly threaded into the threaded hole; the bolt has a terminal end abuttable against the main body.

8. The pneumatic rust-removing tool as claimed in claim 7, wherein the main body is provided at an outer periphery thereof with a guide groove, into which the terminal end of the bolt extends.

9. The pneumatic rust-removing tool as claimed in claim 7, wherein a resilient ring is sleeved onto the bolt and abutted against an outer periphery of the barrel.

10. The pneumatic rust-removing tool as claimed in claim 1, wherein the mount is provided with a plurality of mounting holes, into which the rust-removing needles are inserted respectively.

* * * * *